United States Patent [19]

Taubenmann

[11] 4,211,345

[45] Jul. 8, 1980

[54] APPARATUS FOR THE FEEDING (METERING) OF LIQUID SYNTHETIC-RESIN COMPONENTS

[75] Inventor: Peter Taubenmann, Munich, Fed. Rep. of Germany

[73] Assignee: Krauss-Maffei Aktiengesellschaft, Munich, Fed. Rep. of Germany

[21] Appl. No.: 898,775

[22] Filed: Apr. 21, 1978

Related U.S. Application Data

[63] Continuation-in-part of Ser. No. 782,962, Mar. 30, 1977, Pat. No. 4,167,236.

[30] Foreign Application Priority Data

Aug. 11, 1977 [DE] Fed. Rep. of Germany ....... 2736177

[51] Int. Cl.$^2$ ............................................. B67D 5/46
[52] U.S. Cl. .................................. 222/134; 222/334; 92/205; 277/9.5; 277/77; 277/110
[58] Field of Search ..................... 222/334, 134, 386; 277/9.5, 77, 110; 92/202, 205

[56] References Cited

U.S. PATENT DOCUMENTS

| 984,837 | 2/1911 | Morrison et al. | 92/205 X |
| 1,145,733 | 7/1915 | Wright | 92/205 |
| 1,372,262 | 3/1921 | Yount | 92/205 |
| 3,890,922 | 6/1975 | Nordenholt | 222/334 X |
| 3,923,428 | 12/1975 | Clark et al. | 92/205 X |

*Primary Examiner*—Joseph J. Rolla
*Attorney, Agent, or Firm*—Karl F. Ross

[57] ABSTRACT

A dosing unit for highly filled synthetic-resin components, usually a polyol and an isocyanate mixed with glass fiber, barite or chalk, comprises a piston which displaces the components or one of them, especially the filled component under the control of fluid pressure. The change in the feed rate of the fluid-controlled unit is varied by varying the speed of the displacing member of the fluid-controlled unit which is preferably a piston-and-cylinder arrangement. The piston-and-cylinder arrangement has its drive piston formed with a normal seal and its dosing or metering piston formed with an adjustable seal such that a tool can be inserted through the cylinder wall to rotate a toothed member of this latter piston to adjust for wear of its seal.

7 Claims, 4 Drawing Figures

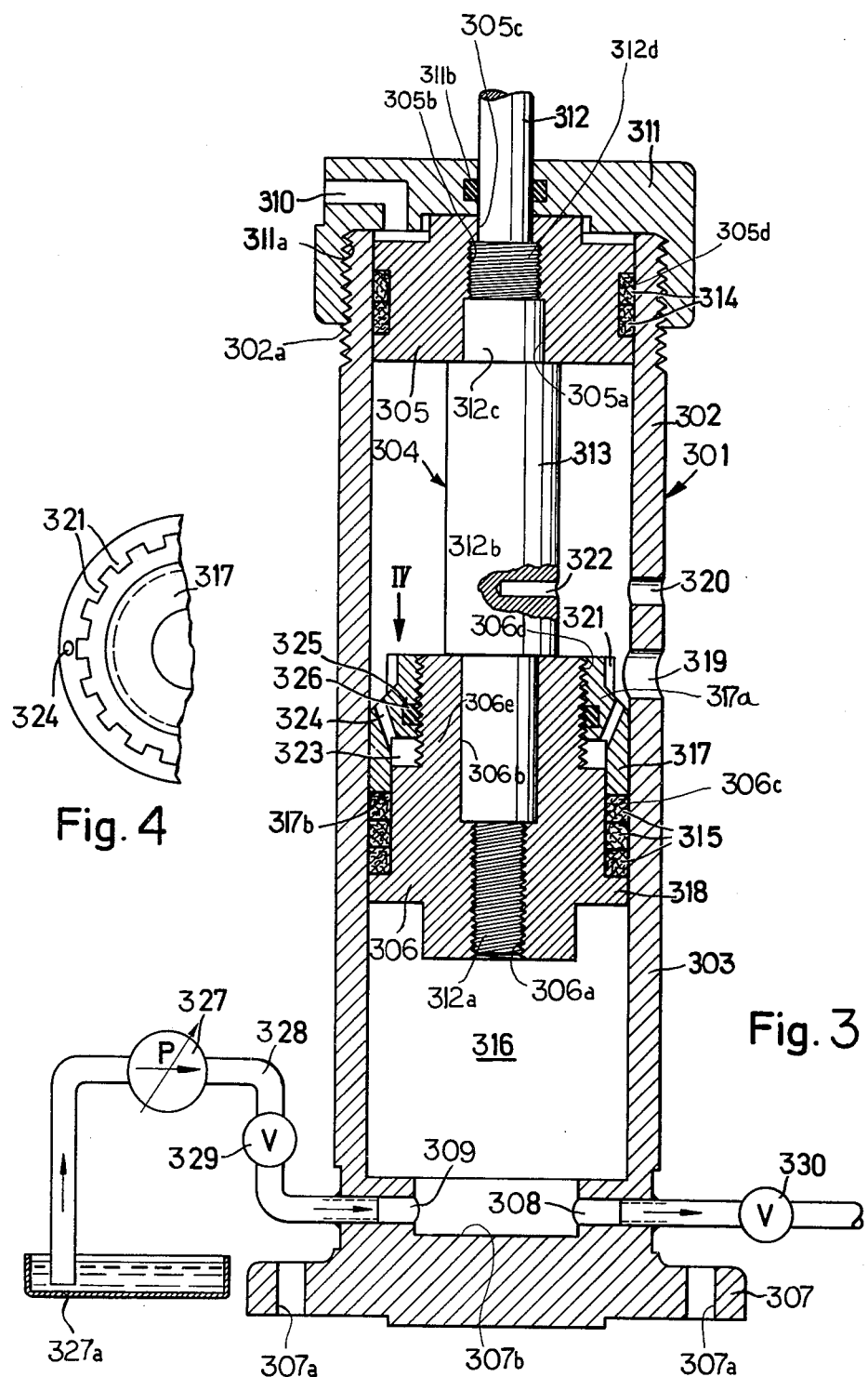

APPARATUS FOR THE FEEDING (METERING) OF LIQUID SYNTHETIC-RESIN COMPONENTS

CROSS-REFERENCE TO RELATED APPLICATION

This application is a continuation-in-part of my commonly assigned copending application Ser. No. 782,962 filed Mar. 30, 1977 (now U.S. Pat. No. 4,167,236 issued Sept. 11, 1979).

FIELD OF THE INVENTION

The present invention relates to improvements in the dosing of abrasive-filled synthetic-resin materials, especially by a system of the type described in the aforementioned copending application and, more particularly, to improvements in double piston-and-cylinder arrangements for use with abrasive materials.

BACKGROUND OF THE INVENTION

The dosing of liquid synthetic-resin components, especially polyols and isocyanates for the production of polyurethane, must be carried out with the utmost care and concern for optimum mixing and displacement parameters if the desired results are to be obtained.

For precise dosing, numerous processes and devices have been proposed. For example, accurate dosing of the components to the mixing head can be effected for example by means of high speed axial-piston pumps.

However, if the synthetic-resin components have abrasive characteristics, i.e. contain abrasive fillers which operate physically and not chemically upon the moving parts, rapidly operating piston pumps are not suitable because they suffer significant mechanical wear.

Synthetic-resin components are considered abrasive when they are highly filled, i.e. when they contain various inorganic and organic fillers, extenders or pigments such as barite, glass fiber and clay. In the production of polyurethanes, such additives are commonly supplied to the polyol component.

It is nevertheless possible to operate with synthetic-resin components containing abrasive constituents when the displacement is effected by slowly operating piston pumps adapted to perform a single stroke for each dosing operation, i.e. to displace the entire quantity of the component required for a single molding operation to the mixing head in a single stroke. Such slowly operating piston pumps are known.

In German open application (Offenlegungsschrift) DT-OS 1454898, there is described an apparatus for the dosing of synthetic-resin components whereby the change in the displacement quantity is effected by the substitution of piston pumps having pistons of different diameters and by a stepless variation of the stroke of these pumps. This arrangement has the disadvantage that it requires a large supply facility, substantial mounting work and high capital expenditure since a common support for the various pumps is expensive.

It is also known to carry out the dosing with slowly operating piston pumps which have effective piston surfaces which can be varied in steps. This conventional arrangement is expensive to construct originally and has the operating disadvantage that the piston surfaces are stepped and hence a stepless control of the operation of the device is not possible.

In the dosing of abrasive-filled synthetic-resin materials using dosing or metering pistons, the metering piston generally is provided with seals which cooperate with the cylinder wall for displacing the synthetic-resin material from this cylinder. When the fillers for the flowable synthetic-resin component or components are highly abrasive, the seal or packing of this piston is subjected to especially heavy wear and, from time-to-time, the cylinder assembly must be rendered inoperative and taken apart to replace or adjust the packing so as to restore effective sealing. This is obviously a time-consuming, expensive and inconvenient process which gives rise to considerable interruption of the operations of the molding system.

OBJECTS OF THE INVENTION

It is the principal object of the present invention to provide an apparatus for the improved dosing of highly filled liquid synthetic-resin components at least one of which has abrasive properties.

Another object of the invention is to provide a process for the dosing of abrasive synthetic-resin components which eliminates the disadvantages of earlier systems, especially in the production of high pressure polyurethane, and yet affords exact dosing of the components at minimum cost.

Still another object of the invention is to provide an improved apparatus for the purposes described which allows exact dosing of the synthetic-resin components and minimum capital expenditure.

It is also an object of this invention to extend the principles set forth in the abovementioned application Ser. No. 782,962 and thus to provide, especially for any metering cylinder for handling abrasive-containing flowable materials, an arrangement whereby the disadvantages described above can be obviated.

It is still another object to provide, especially in a system of the type described, in a metering piston-and-cylinder arrangement whereby adjustment of the sealing effectiveness can be carried out without disassembly of the unit.

SUMMARY OF THE INVENTION

These objects are attained, in accordance with the present invention, by providing a fluid-pressure responsive device having a displacement member which is actuatable by fluid pressure and can drive an abrasive-liquid component to the mixing head. According to the invention, the displacement speed of this member is varied to permit control of the displacement rate, i.e. the displacement of the abrasive component per unit time, in a stepless manner.

According to the invention, the process comprises the dosing of liquid synthetic-resin components using a piston-and-cylinder unit in which a single displacement of the piston for each stroke drives the prescribed quantity of the component to the mixing head for a single mold operation. According to this aspect of the invention, the change in quantity per unit time of the piston-and-cylinder unit is effected by varying the piston speed. According to a preferred embodiment of the invention, the variation in the piston speed is effected by changing the rate of displacement of a fluid-pressure medium to this unit, i.e. a liquid which applies the displacement force to the piston of the unit.

Preferably the change in displacement (quantity of the abrasive component displaced) is effected by controlling the fluid pressure supplied to the unit by a variable-displacement or variable-speed pump (hereinafter variable pump). According to another aspect of the invention, an apparatus is provided for dosing the liquid synthetic-resin components using a piston-cylinder unit whereby the displacement of the piston through a single stroke feeds a predetermined and sufficient quantity of this component to the mixing head feeding a mold during each molding operation. According to this aspect of the invention, the piston-cylinder unit comprises a double piston which separates the dosing cylinder from a drive cylinder, the latter being supplied with the fluid-pressure medium by an adjustable pump. The fluid-pressure medium acts upon the double piston and, in turn, displaces the same to drive the liquid component to the mixing head. Advantageously, the variable pump is connected to the working chamber of the dosing cylinder through appropriate ducts which can include a pressure relief valve and be supplied from a reservoir for the pressure medium. The dosing cylinder or chamber, in turn, is connected to a source of the liquid component to be displaced to the mixing head via a respective duct which can be blocked.

Advantageously, a return line is connected to the pump and is branched to a control device which can block this line. The line may be provided, moreover, with a check valve. In the open condition of the control device, the adjustable pump circulates the fluid-pressure medium along a closed circulation path.

According to another preferred embodiment of the invention the piston of the dosing cylinder and the piston of the working or drive cylinder can have different effective piston surface areas so that the piston-cylinder unit can serve as a pressure transformer.

According to the invention, the dosing of the liquid components can be carried out steplessly in an especially effective manner utilizing the advantages of the slowly operating piston pump at substantially reduced cost. This is in contrast to the conventional systems and can, without special equipment, be provided for the serial feeding of a plurality of control units and mixing heads.

The apparatus is best used for the production of mixtures capable of reaction to produce polyurethanes, in which case the abrasive-liquid component will usually be the polyol to which the filler is added. The system of the invention where the double-chamber piston-and-cylinder unit is preferably then used for the dosing of polyol. However, the unit is not limited to such operations and can be used for the dosing of synthetic resins of all types. While I prefer to provide the apparatus for low-pressure as well as high-pressure mixing, best results are obtained when it is used for high-pressure mixing.

I have also found that it is possible to provide the metering or dosing piston, whose seals are highly susceptible to wear when the synthetic-resin material contains abrasive materials, so as to adjust the seals and compensate them for wear without disassembling the unit. According to this aspect of the invention, the metering or dosing piston is provided with two threadedly engaging parts which define an outwardly open seal-receiving space between them, the periphery of one of these members being formed with an array of teeth engageable by a tool which can be inserted through a window in the wall of the cylinder preferably between the driving piston and the metering or dosing piston, so as to effect relative rotation of these two members.

According to a feature of the invention, the teeth are formed on a threaded sleeve which is provided with an internal thread engaging an externally threaded boss of the other member, the teeth being set inwardly, e.g. on a bushing of this sleeve. Thus the teeth are located at a given radial distance inwardly of the inner wall of the cylinder.

The opening or window in the cylinder is provided such that the teeth are at the level of this window in one of the extreme positions of the double piston. Furthermore, the wall of the cylinder can advantageously be provided with a second opening through which another tool can be inserted to hold the other part of the piston and enable rotation of the sleeve by the first-mentioned tool.

It has also been found to be advantageous to form the threaded connection between the two mutually adjustable points of the dosing pistons with a self-locking thread arrangement, e.g. by insetting a synthetic-resin or rubber ring in a groove of the threaded portion of the sleeve so that the external threads of the other member of the piston are gripped by this ring.

It will be apparent that this arrangement allows the seal space of the dosing piston to be pregressively diminished in volume without disassembly of the unit. Notwithstanding this ability to compensate for wear of the seal, the system allows a precise and stepless metering of abrasive synthetic-resin components in a relatively simple manner.

BRIEF DESCRIPTION OF THE DRAWING

The above and other objects, features and advantages of the present invention will become more readily apparent from the following description, reference being made to the accompanying drawing in which:

FIG. 3 is an axial cross-sectional view of a piston-and-cylinder arrangement which can be used in the system of FIG. 1 and 2 according to the present invention; and FIG. 4 is a fragmentary plan view taken in the direction of arrow IV of a portion of the device of FIG. 3

SPECIFIC DESCRIPTION

Figure 1:
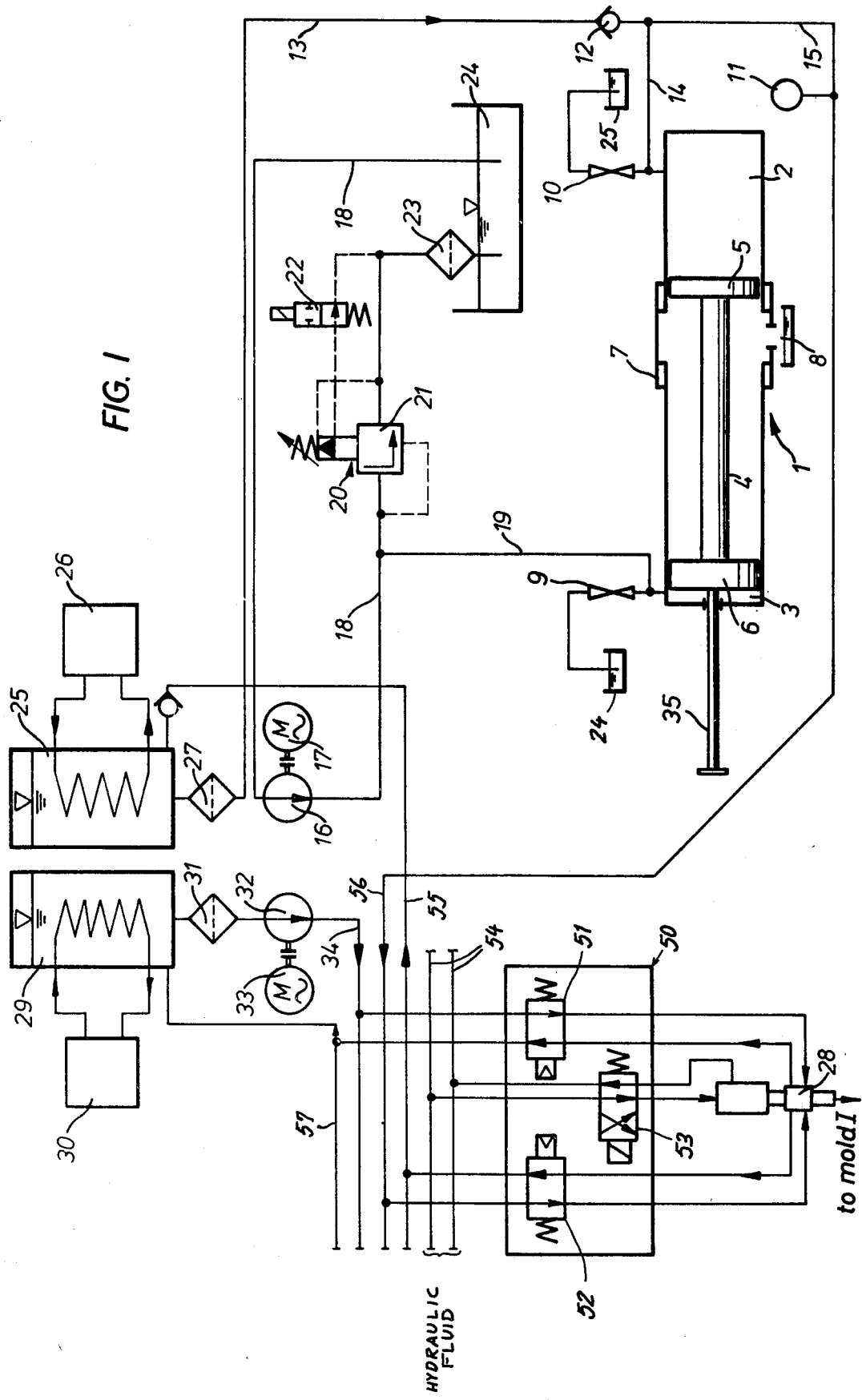
FIG. 1 is a flow diagram illustrating one embodiment of the invention.

In FIG. 1 of the drawing, there is shown a pair of supply vessels 29 and 25 containing the respective liquid synthetic-resin components for the formation of polyurethane, mainly, an isocyanate and a polyol, the latter containing a high proportion of fillers as described. The supply vessels are under a pressure, e.g. air pressure, of substantially 3 to 6 bar. Temperature-control units 26 and 30 are provided to maintain predetermined temperatures of the components in the liquid state within the vessels 25 and 29 respectively.

The isocyanate component is drawn via a filter 31 and a pump 32, driven by an electric motor 33, from the vessel 29 and supplied via line 34 to the mixing head 28.

The dosing of the polyol component, containing the abrasive constituents, is effected via a piston-cylinder unit 1 which comprises a dosing cylinder 2 for displacement of the polyol and a working or drive cylinder 3 which is operated by a fluid-pressure medium free from abrasive components, e.g. hydraulic fluid or oil. The two cylinder chambers are separated by a double piston having a piston rod 4 and respective piston heads 6 and 5. The drive cylinder and the dosing cylinders are connected by a threaded sleeve 7 formed with an opening 8 for recovering any fluids which leak past the respective pistons. FIGS. 3 and 4 show a preferred double-piston and cylinder system.

The effective surface areas of the pistons 6 and 5 can be different so that the piston-cylinder unit 1 also serves as a pressure transformer, displacing the polyol component with a different pressure from that delivered in cylinder or chamber 3. For example, the effective area of piston 5 is $\pi R^2$ where R is the radius of this piston. The effective area of piston 6 is $\pi(R^2-r^2)$ where r is the radius of rod 25. If a pressure $P_1$, is applied to cylinder 2, the pressure $P_2$ in cylinder 3 will be $P_2=P_1R^2/R^2-r^2$.

An adjustable pump 16 is provided which can operate at high pressures to, for example, 300 bar with relatively small displacement and hence low cost, for supplying the polyol component at lower pressure and a higher displacement rate.

Figure 2:
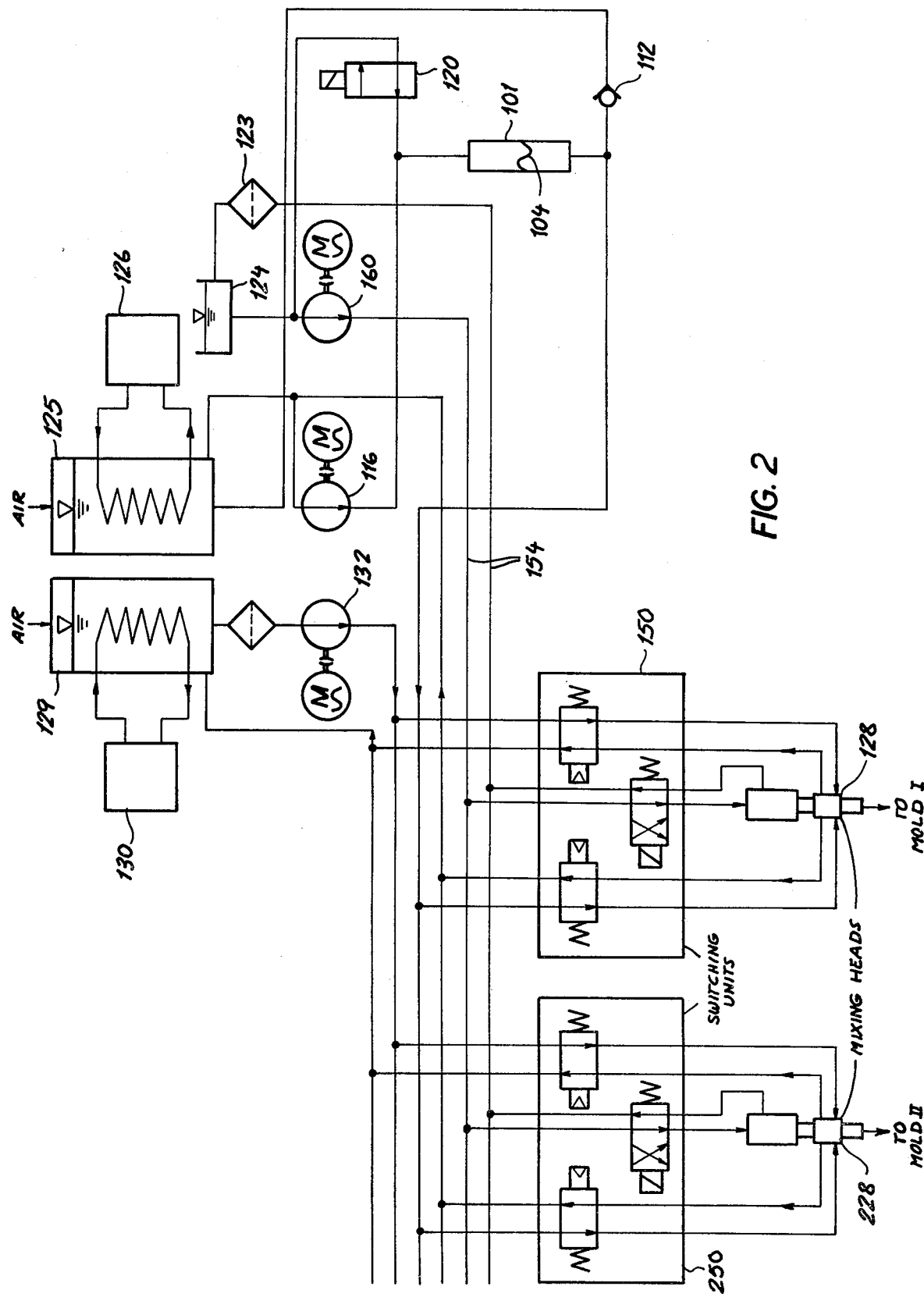
FIG. 2 is a flow diagram illustrating another embodiment thereof.

As can be seen in FIG. 2, the piston-cylinder unit 1 is equivalent to other conventional fluid-pressure actuated displacement devices such as the bellows or membrane accumulator represented in FIG. 2. Both of these devices are contemplated within the term "piston-cylinder unit" as this term is used in the present aplication.

The polyol component is drawn from the receptacle 25 through the filter 27 via lines 13 and 14 to the dosing cylinder or chamber 2 of the piston-cylinder unit.

The filter 27 can be, for example, a fine large-area sieve.

In line 13 there is provided a check valve 12 which permits the flow of the polyol component from the reservoir 25 unidirectionally to the dosing cylinder 2, but prevents return flow in the opposite direction. To vent air from the system and to discharge excess polyol component, a conventional venting valve 10 is provided at the inlet of the line 14 to the dosing cylinder 2.

It is possible, in accordance with the present invention, to provide a system for the rapid filling of the dosing cylinder 2 with the respective synthetic-resin component. To this end, a feed pump can be provided in the feed line 13. This pump can be a conventional rotary pump capable of operating at low pressure with abrasive liquids. Alternatively, the supply vessel 25 can be provided with a higher air pressure.

Once the dosing cylinder 2 is filled, with the piston, 4, 5, 6 in the left hand position illustrated the hydraulic medium can be fed to the cylinder 3 to drive the piston to the right and displace the polyol component via line 15 to the mixing head 28.

To protect the system against underpressures or overpressures and disruption resulting from either, a diagrammatically illustrated electric contact manometer 11 can be provided along the line 15 to shut off operation of the device should a pressure deviating from the normal operating range be detected.

The dosing of the synthetic-resin component by the piston-cylinder unit 1 is effected by varying the piston speed. In the illustrated embodiment, the variation of the piston speed is effected by changing the displacement rate or the pressure of the adjustable pump 16. The latter is connected by a clutch to the motor 17 and displaces the hydraulic medium via lines 18, 19 from a supply reservoir 24 into the working or drive cylinder 3. At the inlet to the drive cylinder 3, a venting valve 9 can be provided.

Any suitable fluid can serve as the drive medium or piston-displacing fluid. Preferably the medium is conventional hydraulic or oil as noted.

During filling of the cylinder tube with the polyol component via line 14 under the pressure of the fluid in vessel 25 or via the feed pump mentioned, the control valve 20 is opened so that hydraulic fluid from the pump 16 is bypassed to the reservoir 24 and does not resist the displacement of the piston 4, 5, 6 to the left. The control valve 20 can include a main valve 21 and an electromagnet precontrolled valve 22.

The reservoir 24 for the pressure medium is maintained preferably at atmospheric pressure. The variable pump 16 is preferably a rapidly operating piston pump with a speed of about 750 to 1500 rpm. Because it is possible to provide a pressure transformer in the piston-cylinder unit 1, the variable pump 16, which displaces oil and not the abrasive synthetic-resin component, can be an expensive relatively small pump capable of generating a maximum pressure of, say, 200 bar to 300 bar. The variable pump 16 can be driven continuously with the control unit 20 employed to maintain a pressureless state during filling of the cylinder 20. When the control valve 20 is switched over, pressure is built up at line 19 and in cylinder 3 and the piston 4, 5, 6 is displaced to the right. By varying the displacement per unit time of the variable pump 16, e.g. by tilting the control plate of the axial piston pump, it is possible to finely regulate the quantity of the polyol component which is displaced by the piston 4, 5, 6 to the mixing head 28.

Furthermore, it has been found to be advantageous to make the lines, the check valve 12 and the control unit 20 relatively short or of large cross section to reduce the flow resistance in the various flow passages.

The sequence of filling the molds is limited by the duration of filling of the dosing cylinder 2. For some purposes, a very brief sequencing time is desirable and, in this case, two piston-cylinder units can be provided to operate alternatively with respective control valves and feed pumps. Thus one of the piston-cylinder unts can be filled while the other is discharging and vice versa. The control of the sequencing time can also be effected by varying the piston stroke with, for example, the aid of a control rod 35 connected to the piston and operating electric contacts (limit switches) regulating this stroke.

Naturally, the system of the present invention can also make use of other types of pumps, rather than the variable-displacement of the hydraulic medium. For example, a constant-displacement pump may be used at 16 while the motor 17 is a variable speed motor so that the displacement per unit time is a function of the control of the speed of the drive motor.

As is also apparent from FIG. 1, mixing head 28 is of the recirculating self-cleaning type described and illustrated in U.S. Pat. No. 3,706,515, the cleaning member of which can be hydraulically displaceable via a reversing valve 53 connected to pressure lines 54.

In addition, each of the molds can be provided with a switching unit represented at 50 and having a pair of electrically actuated valves 51 and 52 for controlling, respectively, the feed of the synthetic-resin components to the mixing head 28.

FIG. 2 shows another embodiment of the invention in which the supply vessels 125 and 129 for the polyol and isocyanate respectively, are under air pressure and have respective temperature control units 126 and 120. The pumps 116 and 132 serve to feed the hydraulic pressure medium and the isocyanate component, respectively, as described, while another pump 160 feeds hydraulic fluid from the reservoir 124 to the pressure lines 154, corresponding to lines 54 previously described. As in the embodiment of FIG. 1, a filter 123, analogous to the filter 23, is provided to remove contaminants from the return hydraulic fluid. In FIG. 2, the control unit 20 is formed by an electromagnetically operated valve 120 which, when opened, permits recirculation of the hydraulic medium. Each of the mixing heads 128, 228 to the respective molds I and II, representing any number of molds up to, for example, ten is provided with a respective switching unit 150, 250 etc.

In this embodiment, moreover, the piston-cylinder unit 1 is replaced by a membrane-diaphragm unit 101 whose membrane 104 forms the displacement member for the polyol component which, after being drawn into the lower chamber via the check valve 112, is displaced to the mixing head 128, 228 etc., as determined by the switching units 150, 250 in operation, as previously described. The system illustrated in FIG. 2 has been found to be effective for displacements of 300 to 8000 grams per second of the filled materials and can operate 1 to 10 mixing heads. They may use synthetic-resin components consisting of a polyol and an isocyanate mixed with glass fiber, barite, chalk or other, e.g. abrasive fillers.

The piston-and-cylinder unit illustrated in FIGS. 3 and 4 comprises a cylinder 301 provided with a double piston 304. This unit can, of course, be used in place of the combined or double-piston units of the systems of FIGS. 1 and 2.

The cylinder 301 and the piston 304 are functionally subdivided so as to form at their respective upper ends, a drive cylinder 302 for the drive piston 305 and, at their respective lower ends, a dosing or metering cylinder 303 and a dosing and metering piston 306.

The dosing or metering cylinder 303 is closed at its end by a flange 307 which is provided with bores 307a whereby the unit an be attached to a part of the machine or to a base or housing. The flange 307 is unitary with the wall of the cylinder 303 and forms a compartment 307b into which a pair of bores 308 and 309 open radially. The bore 309 receives the synthetic-resin material from a reservoir 327a via a variable-displacement pump 327, a pipe 328 and a valve 329.

The other bore 308 delivers the synthetic-resin component from the dosing or metering space 316 via a valve 330. The compartment 307b forms part of the metering spaced 316.

The exterior of the upper cylinder 302 is threaded at 302a to engage the internal thread 311a of a removable cap 311. The latter is formed with a seal 311b hugging the control rod 312 and with a passage 310 through which the pressure medium is delivered to the drive cylinder portion 302 of the cylinder 30.

The rod 312 is provided with a number of stepped portions as will be discussed below.

At its lower end, the rod 312 is formed wiht a small-diameter threaded shank 312a which terminates at an unthreaded portion 312b of slightly larger diameter, the latter adjoining the unthreaded piston rod 313 which bridges the two pistons 305, 306. Above the piston rod 313 is a small diameter unthreaded portion 312c which adjoins a threaded portion 312d of slightly smaller diameter, this diameter being greater than the diameter of rod 312 as it passes through the cap 311. The pistons 305 and 306 are connected to the control rod 312 and the piston rod 313 by the threaded portions 312a and 312d mentioned earlier.

More specifically, the piston 305 has an internally stepped bore whose larger diameter portion 305a receives the unthreaded portion 312c and adjoins an internally threaded portion 305b threadedly engaging the member 312d. A small diameter step 305c closely surrounds the rod 312.

Similarly, the piston 306 is provided with a stepped bore whose small diameter portion 306a is internally threaded and adjoins a large diameter portion 306b which receives the unthreaded portion 312b.

The piston 305 is formed with an outwardly open circumferential groove 305d receiving the packing or sealing bodies 314. Packing and sealing bodies 315 are received in an outwardly open space of the piston 306 as well, as will be discussed in greater detail below.

While the drive piston 305 is subjected to the pressure of a normal pressurizing medium, i.e. hydraulic fluid or oil, and thus can use a conventional sealing material at 314 which is subjected only to the usual stresses and wear, the dosing and metering piston 306 and its packing or sealing material 315 come into contact with the abrasive material contained in the synthetic resin whic is admitted through bore 309 when the valve 330 is closed. Naturally, when the cylinder 305 is pressurized, the abrasive-filled flowable synthetic-resin component is expelled from the chamber 315, 307b through the outlet 308, valve 329 being closed and valve 330 opened. Thus the seals 315 are subjected to considerable wear and adjustment of these seals, e.g. by progressive compression thereof, is desirable as the device is used and wear proceeds.

Naturally, as indicated previously, it is inconvenient, time-consuming and unproductive to disassemble the double piston-cylinder assembly each time an adjustment of the packing or sealing 315 is desirable.

According to the invention, therefore, the piston 316 is formed with two threadedly interengaged parts which can be displaced angularly to progressively compact the seals 315 by reducing the volume of the seal space 306c.

A sleeve 317 can be provided for this purpose. The sleeve 317 has a bushing 317a which is internally threaded and engaged the screw thread 306d along the exterior of a boss 306e of the piston body 306. In addition, the threaded sleeve 317 has an end face 317b which is spaced from but juxtaposed with an outwardly extending shoulder or flange 318 of the piston body 306 to define the space 306c between them.

To allow adjustment of the seal 315, i.e. compression of the latter to compensate for wear, the outer wall of the cylinder 301 is provided with a window 319 through which a tool, e.g. a rod, can be inserted to engage between teeth 321 formed on the outer periphery of the bushing 317a of sleeve 317. Using this tool, the sleeve 317 can be rotated while the body 306 is held against rotation by the control rod 312. The progressively diminishing space 323 between the bushing 317a and the body 306 is vented via the passages 324.

To prevent rotation of the rod 312 and, more generally, of the piston while the sleeve 317 is being rotated, a further rod or bar can be inserted through a bore 320 also formed in the wall of the cylinder 301 and adapted to be received in one of a plurality of radial bores 322 drilled into the piston rod 313.

To prevent undesired relative rotation of the members 306 and 317, the threaded connection between them may be formed as a self-locking screw-threaded connection, e.g. by setting a synthetic-resin ring 326 in an outwardly open circumferential groove 325 of the bushing 317a.

The openings 319 and 320 shown in the drawing have been indicated as circular and do not affect the operation of either the drive piston or the metering or dosing piston in performing the usual functions. This is particularly the case when the openings 319 and 320 are effective in the upper extreme position of the double piston 304. It has also been found to be advantageous to form the teeth 321 in a portion of the periphery of the bushing having an internal diameter which is less than the outer diameter of the sleeve 317. The array of teeth is provided all around the bushing.

I claim:

1. In a device for metering a quantity of a flowable material, especially an abrasive-filled synthetic resin, the improvement which comprises in combination:
   a cylinder;
   a pair of pistons coupled together through a piston rod within said cylinder, one of said pistons constituting a drive piston and defining a pressurizable compartment in said cylinder, the other of said pistons defining a metering compartment in said cylinder;
   means for feeding flowable material to said metering compartment, said other piston having a seal cooperating with a wall of said cylinder to seal said metering compartment; and
   means on said other piston operable from the exterior of said cylinder for compensating for wear of said seal, said means for compensating for wear of said seal including a sleeve threaded onto said other piston and defining an outwardly open space therewith receiving said seal, said sleeve being formed along an outer peripheral portion thereof with an array of axially projecting teeth, said wall of said cylinder being formed with an opening for admitting a tool into engagement with said teeth whereby said sleeve can be rotated relative to said other piston, and a window in addition to said opening to admit a tool into engagement with said piston rod to retain said other piston against rotation while said sleeve is rotated.

2. The improvement defined in claim 1 wherein said teeth are spaced inwardly from said wall of said cylinder.

3. The improvement defined in claim 1 wherein said opening is at the level of said teeth in one extreme position of said pistons.

4. The improvement defined in claim 1, further comprising means including a locking ring for preventing selfrotation of said sleeve relative to said other piston.

5. The improvement defined in claim 1 wherein each of said pistons is threadedly connected to a rod extending from said cylinder, said other piston is formed with an externally threaded boss and has a shoulder defining one side of a space for said seal, said sleeve has an axially extending portion having an end face defining an opposite side of said space, said sleeve further comprising an internally threaded bushing screwed onto said boss, said internally threaded bushing being formed with an inwardly open groove provided with a threadlocking ring.

6. The improvement defined in claim 5 wherein said opening is at the level of said teeth in an extreme postion of said pistons, said piston rod formed with at least one radial bore, said wall being provided with said window aligned with said bore in said extreme postion of said pistons.

7. An apparatus for dosing a liquid synthetic-resin component to a mixing head which comprises:
   a cylinder and a double piston received in said cylinder, one piston of which defines a first chamber adapted to receive said component and the other piston of which defines a second chamber receiving a fluid for displacement of the double piston, said pistons being interconnected by a piston rod and said first chamber being connected to said mixing head;
   a variable-displacement pump connected to said second chamber for feeding a hydraulic medium thereto at a variable rate, thereby displacing said double piston;
   a source of said component;
   a conduit connecting said source with said first chamber;
   checkvalve means in said conduit permitting said component to flow from said source to said first chamber but preventing reverse flow from said first chamber to said source, said one of said pistons being provided with a seal; and
   means for adjusting said seal externally of said cylinder without disassembling same, said mens for adjusting said seal including a sleeve threaded onto said other piston and defining an outwardly open space therewith receiving said seal, said sleeve being formed along an outer peripheral portion thereof with an array of axially projecting teeth, said wall of said cylinder being formed with an opening for admitting a tool into engagement with said teeth whereby said sleeve can be rotated relative to said other piston, and a window in addition to said opening to admit a tool into engagement with said piston rod to retain said other piston.

* * * * *